Patented Aug. 7, 1945

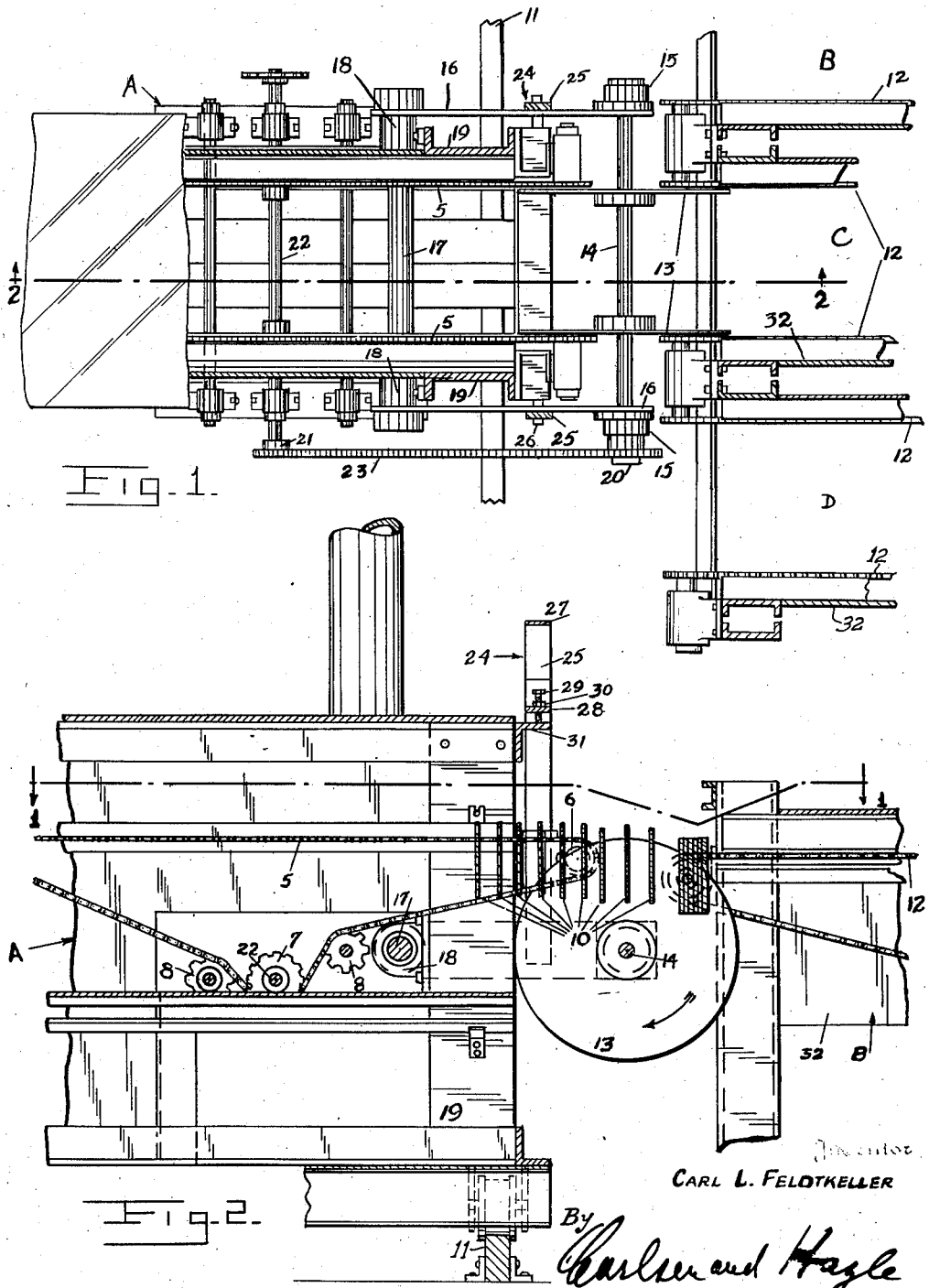

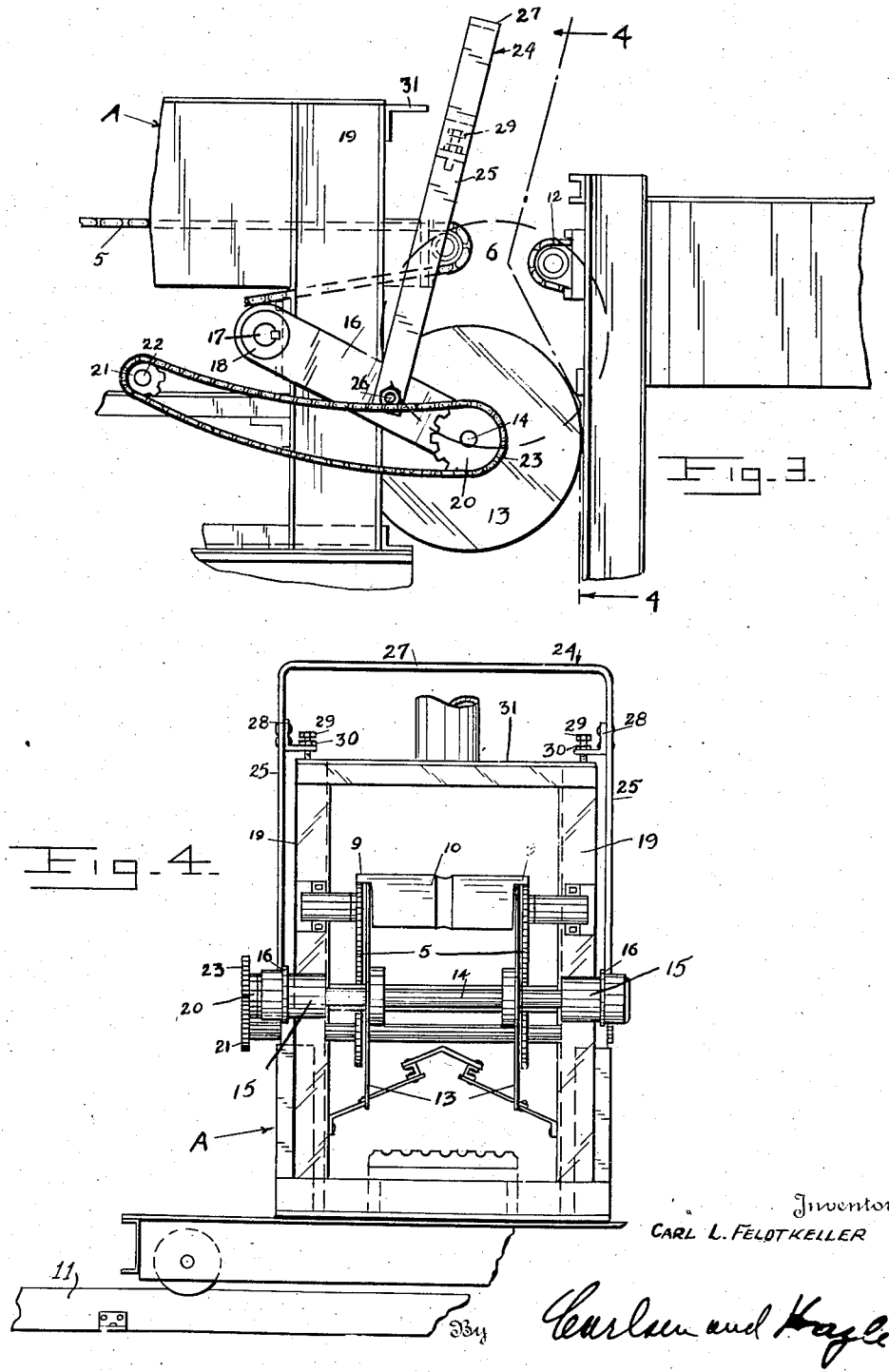

2,380,957

UNITED STATES PATENT OFFICE 2,380,957

TRANSFER MECHANISM FOR GRID PANELS

Carl L. Feldtkeller, Milwaukee, Wis., assignor to Solar Corporation, Milwaukee, Wis., a corporation of Delaware Original application October 16, 1943, Serial No. 506,590. Divided and this application April 1, 1944, Serial No. 529,081

13 Claims. (Cl. 198—25)

This invention relates to the art of making plates for storage batteries and the primary object is to provide a simple, efficient, and practical mechanism for transferring grid panels, each composed of two interconnected grid plates, from one conveyor to another during the manufacturing process.

The present application is a division of my co-pending parent application for Apparatus and method for preparing battery plates, Serial No. 506,590, filed October 16, 1943, to which application reference is made for a more complete understanding of the entire apparatus in which the present invention is or may be employed.

In the accompanying drawings which illustrate a preferered embodiment of the invention—

Fig. 1 is a sectional plan view, on line 1—1 in Fig. 2, showing the improved transfer mechanism arranged to transfer grid panels from the conveyor, of a drying oven, selectively to one of a series of conveyors extending into curing chambers.

Fig. 2 is a sectional elevation on line 2—2 in Fig. 1.

Fig. 3 is a side elevation showing the transfer unit in a released or adjusted position to permit transverse or shifting adjustments of the drying oven and its conveyor with respect to the curing conveyors, whereby the transfer device may be readily brought into operative position with respect to any selected curing conveyor.

Fig. 4 is an end elevation of the dryer oven and transfer device, as on line 4—4 in Fig. 3, but with the transfer device in its raised or operative position.

Referring to the drawings more particularly and by reference characters A designates generally a dryer oven through which the panels, after being filled with paste, are conveyed while being subjected to heat in order to remove a substantial portion of the moisture contained in the paste. The mechanical details or characteristics of the oven unit A are of little importance except to note that it includes a pair of transversely spaced conveyor chains 5, extended over suitable supporting pinions 6, 7, 8, etc., and these conveyor chains are spaced apart at such distance as to support the oppositely extending lugs 9 at the upper outer corners of the grid panels 10, so that the panels proper will hang suspended between the conveyor chains with ample clearance therewith as shown in Fig. 4.

It should also be noted that the oven A is transversely shiftable to different selected positions, a rail 11 being shown (Fig. 1) as one of two or more of such rails upon which this unit may be conveniently mounted for such transverse adjustments, as more completely illustrated in my copending parent application Serial No. 506,590.

Attention is now directed to the curing apparatus which consists of a series of elongated, parallel, and adjacent chambers B, C, D, etc., defined laterally by parallel side plates 32 and in each of which is mounted a pair of conveyor chains 12, the chains of which are spaced apart a distance equal to the spacing between chains 5 of the oven A. These chambers are disclosed in greater detail in my aforesaid application Serial No. 506,590. These chains 12 travel at a speed considerably slower than the speed of the chains 5 when receiving grid panels from the latter, so that such panels will become more closely spaced on the chains 12, and because of the fact that the curing process is much slower than the pasting of the plates and the drying operation which takes place in the oven A, all as fully set forth in my parent application Serial No. 506,590. In fact the curing conveyors are usually stopped in the chambers, when filled, to prolong the curing process. This situation has accounted for the fact that the pasting and pre-drying of panels has been the limiting factor in the final production of plates, since the greater capacity of the paster and dryer has necessitated either discontinuing those steps in the total process or else racking the pre-dried panels in storage rooms, all of which has either slowed up the process or required additional time, labor, and space.

To overcome these difficulties and objections the paster (not here shown) and dryer oven were mounted on rails, such as 11, for selective shifting movement, and I then provided a series of the curing chambers and conveyors so that the panels delivered from the oven could be selectively fed to the slower moving curing conveyors, and when one of such conveyors became filled panels could be fed into another curing chamber while the first group was curing and without interrupting the operation of either the paster or drying oven.

The transfer mechanism to which the present application is limited operates to convey plates from the delivery ends of the chains 5 to the receiving ends of the conveyor chains 12, and it will be noted that the adjacent ends of such chain pairs project somewhat from their respective units A and C to facilitate this transfer operation.

The transfer mechanism consists essentially of a pair of circular transfer disks 13 secured upon a shaft 14 which is journaled in bearings 15 provided at the ends of supporting arms 16. The other ends of these arms 16 are attached to a pivot pin or shaft 17 journaled transversely of and through the pre-dry oven housing in bearings 18 secured to the upright channels 19 beneath the conveyor chains 5. The arms 16, and the transfer disks 13, may thus swing in upright planes alongside of and at the end of the oven. One end of the shaft 14 carries a sprocket gear 20 over which, and over a similar sprocket gear 21 on the oven conveyor drive shaft 22, is trained a sprocket chain 23 in order to rotate the disks 13. The direction of this rotation is as indicated by the arrow in Fig. 2 and the speed of rotation is, of course, proportional to the speed at which the oven conveyor chains 5 travel.

A yoke or handle loop 24 of inverted U-shape has its depending legs 25 pivotally attached at 26 to the supporting arms 16 so that these arms may be swung up and down by lifting upon the transverse bight portion 27 of the yoke. On inner sides of the legs 25 I provide angle shaped brackets 28 secured in place and tapped to receive stop screws 29 provided with lock nuts 30. When the yoke 24 is grasped and pulled upwardly to a substantially upright position these stop screws 29 may engage an angle 31 secured to the upper end and edge of the oven housing and in this position the yoke will support the arms 16 in a raised position such that the transfer disks 13 will enter between the adjacent ends of the oven conveyor chains 5 as seen in Figs. 1 and 4. On the other hand, by swinging the yoke 24 away from the oven, the stop screws 28 will clear the angle 31 and permit the arms 16 to swing downwardly clearing the disks 13 from the conveyor chains as shown in Fig. 3. The purpose of such adjustments will presently appear. It will be noted that the stop screws 29 may be adjusted to raise and lower the transfer disks 13 accurately through a small range when the yoke 24 is supported on the angle 31.

The operation of the apparatus, while possibly understood from the foregoing, may be briefly reviewed as follows:

The pre-pasted grid panels are fed into the oven A, from the left as seen in Figs. 1-3, and are carried through the oven on the conveyor chains 5 in spaced positions, as suggested in Fig. 2, to permit the free circulation of heated air between the plates and in contact with all surfaces thereof. The conveyor chains 5 are of course operated at a predetermined speed so that the duration of the drying process can be properly timed.

As more fully brought out in my parent application the curing of the plates in the chambers B, C, D, etc. does not require applied heat, but some heat is developed exothermically by the chemical reaction of the paste content, when the plates are spaced a very close distance apart, and for that reason and to provide a sufficiently long curing period, the chains 12 are operated or driven at a comparatively slow speed, relative to that of conveyor chains 5. Thus by properly correlating the speeds of the respective conveyors 5 and 12 the spacing of the panels may be uniformly selected to as close a spacing as .005 to .125 of one inch.

The transfer disks 13 are so positioned, in use, that they enter nicely between the oven conveyor chains 5 alongside the pasted panels as they approach and as the panels reach the delivery ends of these chains they are deposited on the disks whereon they are suspended by the lugs 9. As the disks rotate then in the direction shown they carry the panels across to any one of the curing conveyors, between the conveyor chains 12 of which the disks similarly are positioned. The lugs 9 of the panels then engage these chains 12 suspending the panels thereon and the chains carry away the panels slowly into the curing conveyors.

When one curing conveyor is filled, the pasting machine and pre-drying oven A are momentarily stopped and the operator at that point grasps the yoke 24 and swings it outward to clear the stop screws 29 from the angle or rest 31 and the arms 16 may then swing downwardly, as seen in Fig. 3, whereupon the transfer disks 13 will be withdrawn from between the curing conveyor chains 5 and will clear the receiving ends of the curing conveyors.

The oven A may now be shifted on the rails 11 to align the conveyor chains 5 with the chains 12 of another curing chamber, after which the yoke 24 is lifted back up into place on the rest 31 thus placing the transfer disks in accurate alignment to continue transfering panels as before. The paster and oven is then again set in operation.

It will readily be understood, particularly with consideration to Fig. 2, that with the disks 13 traveling at substantially the same peripheral speed as the travel of chains 5 the upper edges of the disks will engage under the lugs 9 and carry the panels 10 over in about the same spacing intervals as they have when traveling through the oven A, but that because of the difference of speeds between the disks and the chains 12, the panels will be deposited upon the latter in much closer proximity to each other, and by regulating these relative speeds panel spacing may be controlled to a very close and accurately predetermined degree.

It will further be understood that modifications in the apparatus, as herein disclosed, may be made, if within the spirit and scope of the invention as claimed. Having therefore illustrated and described a preferred embodiment of the invention, what is claimed is:

1. In combination, a shiftable primary conveyor, a plurality of secondary conveyors, and a transfer mechanism, including a pair of power operated disks, for transferring objects from the primary conveyor selectively to any one of the secondary conveyors, said disks being adjustable from operative to inoperative positions with respect to the primary conveyor to permit shifting of the primary conveyor with respect to the secondary conveyors.

2. In combination, a series of endless conveyors, a supply conveyor adjustably mounted for selective positioning with respect to the receiving ends of the said endless conveyors, and a power operated transfer mechanism mounted for position adjustment together with the supply conveyor, for transferring objects therefrom to any selected endless conveyor, said transfer mechanism being mounted for selective adjustment into operative and inoperative positions with respect to the supply conveyor.

3. In combination, a series of conveyors each including a pair of transversely spaced chains, a supply conveyor having a pair of chains transversely spaced at approximately the same distance as the distance between the chains of one of the first mentioned conveyors, said supply conveyor being movable into selective alignment with any one of the conveyors of said series, and a power operated transfer mechanism for conveying objects from the supply conveyor selectively to either of the other conveyors, said transfer mechanism being adjustable to an inoperative position to permit movement of the supply conveyor from one of the other conveyors to another.

4. In combination, a primary conveyor adapted to deliver articles at one end, a secondary conveyor having a receiving end extended toward the delivery end to receive articles therefrom, said conveyors being relatively transversely adjustable with respect to each other, a transfer mechanism disposed between the conveyors and having overlapping engagement therewith whereby such articles may be received from the primary conveyor and discharged upon secondary conveyor, said transfer mechanism being mounted for adjustment into an inoperative position whereby one of said conveyors may be transversely adjusted with respect to the other without interference by the transfer mechanism.

5. In combination, a frame supporting an endless conveyor having a pair of transversely spaced chains adapted to carry grid panels by projecting lugs thereof and with the panels suspended between the chains, a second frame having a series of parallel endless conveyors each formed of a pair of chains similarly spaced to those of the first mentioned conveyor, means for shifting one of the frames whereby the conveyor of the first mentioned frame may be selectively aligned with the conveyors of the second frame, and a transfer mechanism adjustably carried by the first mentioned frame for movement into and out of operative association with the conveyor thereof to transfer grid panels from such conveyor to a selected conveyor of the second frame, said transfer mechanism including a pair of spaced disks operative adjacent the respective chains of the conveyor whereby the panels will be engaged by their lugs and transferred over to the chains of one of the second frame conveyors.

6. In an apparatus of the character described, a series of conveyors having their receiving ends directed in a common direction, a frame supporting a supply conveyor and movable with said conveyor into alignment, selectively, with said first mentioned conveyors, and a transfer device adjustably mounted on said frame for movement into operative and inoperative association with the supply conveyor and arranged when in operative position to transfer objects from the supply conveyor to the first mentioned conveyors selectively.

7. In an apparatus of the character described, a series of curing conveyors having their receiving ends directed in a common direction, a frame supporting a supply conveyor and movable with said conveyor into alignment, selectively, with said curing conveyors, a pair of transfer disks for transferring objects from the supply conveyor to the curing conveyor, and means for adjustable mounting said disks including supporting arms pivotally secured to said frame.

8. In a battery plate making apparatus, a plate panel drying oven having a conveyor therein formed of transversely spaced conveyor chains by which grid panels are carried through the oven suspended by lugs resting on the chains, a pair of arms pivotally secured at inner ends to the oven and having outer ends disposed adjacent to the delivery ends of said conveyor chains, power driven disks supported by the arms immediately adjacent the respective chains of the conveyor to remove grid panels therefrom, and means for adjusting said arms to remove the disks from operative association with the conveyor.

9. In a battery plate making apparatus, a plate panel drying oven having a conveyor therein formed of transversely spaced conveyor chains by which grid panels are carried through the oven suspended by lugs resting on the chains, a pair of arms pivotally secured at inner ends to the oven and having outer ends disposed adjacent to the delivery ends of said conveyor chains, power driven disks supported by the arms immediately adjacent the respective chains of the conveyor to remove grid panels therefrom, and screw means for adjusting either of the arms whereby the proper operative relationship of the disks with reference to the respective conveyor chains may be obtained.

10. In a battery plate making apparatus, a plate panel drying oven having a conveyor therein formed of transversely spaced conveyor chains by which grid panels are carried through the oven suspended by lugs resting on the chains, a pair of arms pivotally secured at inner ends to the oven and having outer ends disposed adjacent to the delivery ends of said conveyor chains, power driven disks supported by the arms immediately adjacent the respective chains of the conveyor to remove grid panels therefrom, and a vertically adjustable yoke supporting the arms with the disks in operative positions.

11. In a battery plate making apparatus, a plate panel drying oven having a conveyor therein formed of transversely spaced conveyor chains by which grid panels are carried through the oven suspended by lugs resting on the chains, a pair of arms pivotally secured at inner ends to the oven and having outer ends disposed adjacent to the delivery ends of said conveyor chains, power driven disks supported by the arms immediately adjacent the respctive chains of the conveyor to remove grid panels therefrom, and a vertically adjustable yoke supporting the arms with the disks in operative positions, said yoke being pivotally connected to the arms and releasably supported by the oven, whereby the disks may be released and lowered to an inactive position.

12. In an apparatus of the character described, an oven having a conveyor extending therethrough and projecting with its delivery end therefrom, said conveyor comprising a pair of spaced chains, a curing chamber having a conveyor extending therethrough and projecting with its receiving end therefrom and toward the oven, said curing chamber conveyor comprising a pair of spaced chains in substantial alignment with the chains of the oven conveyor, a pair of transfer disks disposed between the opposed ends of said conveyors adjacent the aligned chains thereof, and means for mounting said disks whereby they may be moved into and out of operative positions.

13. In an apparatus of the character described, an oven having a conveyor extending therethrough and projecting with its delivery end therefrom, said conveyor comprising a pair of spaced chains, a curing chamber having a conveyor extending therethrough and projecting with its receiving end therefrom and toward the oven, said curing chamber conveyor comprising a pair of spaced chains in substantial alignment with the chains of the oven conveyor, a pair of transfer disks disposed between the opposed ends of said conveyors adjacent the aligned chains thereof, and means for mounting said disks whereby they may be moved into and out of operative positions, said mounting means including adjusting elements for adjusting the disks with respect to the conveyors when the disks are in operative positions.

CARL L. FELDTKELLER.